2 Sheets--Sheet 1.

P. McINTYRE.
Improvement in Machines and Molds for Drain-Pipe.

No. 132,169. Patented Oct. 15, 1872.

Witnesses.
E. Häfeli
R. O. Humphrey

Inventor
Peter McIntyre
by W. E. Simonds
Solicitor

2 Sheets--Sheet 2.

P. McINTYRE.
Improvement in Machines and Molds for Drain-Pipe.

No. 132,169.  Patented Oct. 15, 1872.

Witnesses.  
L. Hafflin  
R. O. Humphry

Inventor.  
Peter McIntyre  
by W. E. Simonds  
Solicitor

UNITED STATES PATENT OFFICE

PETER McINTYRE, OF HARTFORD, CONNECTICUT, ASSIGNOR TO THE HARTFORD DRAIN-PIPE-MACHINE COMPANY, OF SAME PLACE.

IMPROVEMENT IN MACHINES AND MOLDS FOR DRAIN-PIPE.

Specification forming part of Letters Patent No. 132,169, dated October 15, 1872.

*To all whom it may concern:*

Be it known that I, PETER MCINTYRE, of Hartford, in the county of Hartford and State of Connecticut, have invented certain new and useful Improvements in Drain-Pipe, Drain-Pipe Molds, and Drain-Pipe Machines, of which the following is a specification, reference being had to the accompanying drawing, in which—

Figure 1:
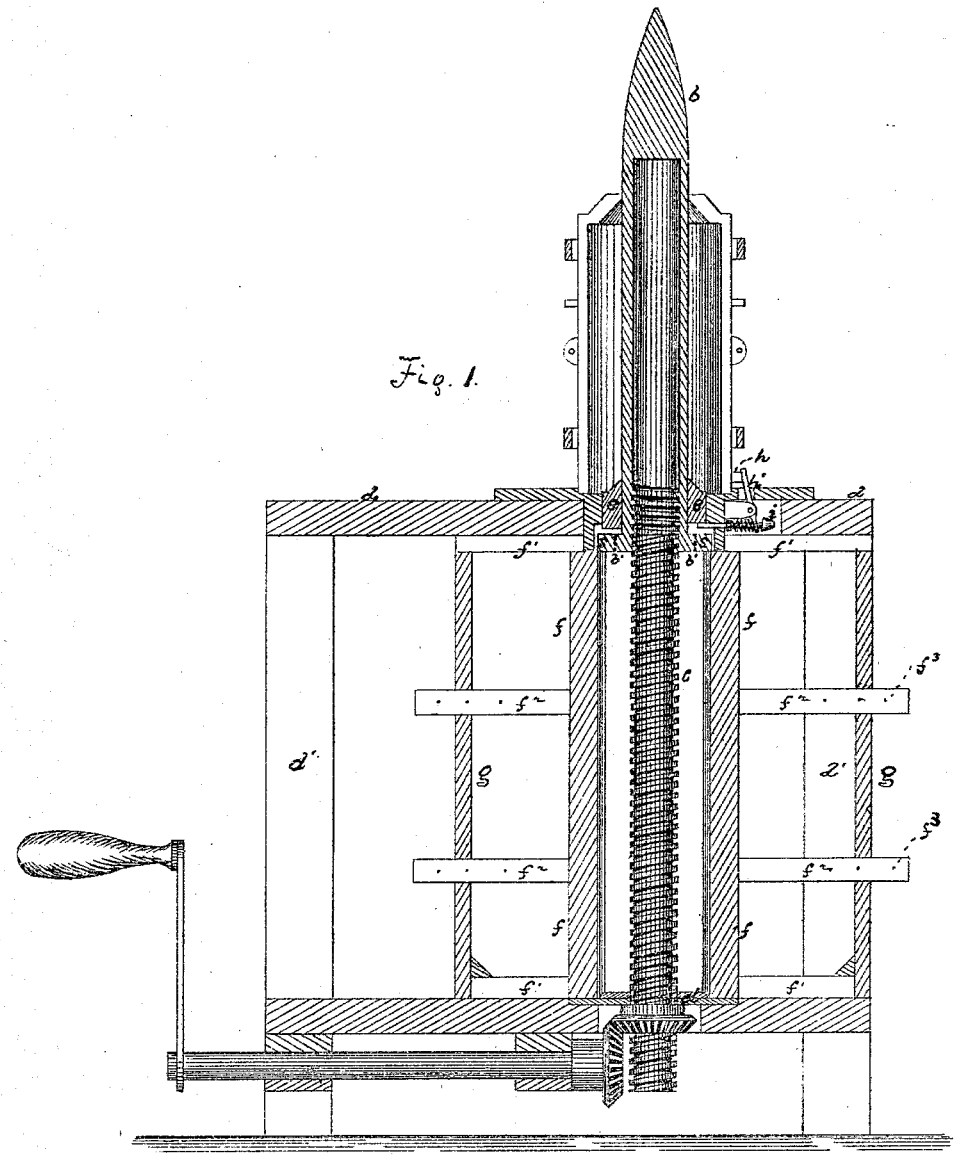
Figure 2:
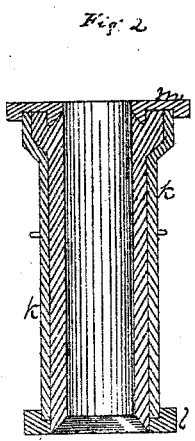
Figure 5:
Figure 3:
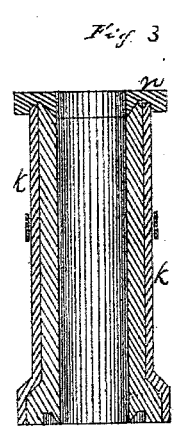
Figure 4:
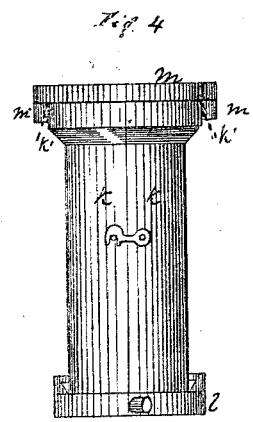

Figure 1 is a central vertical section of the machine; Fig. 2 is a view of one of the halves of a mold with its end attachments as used upon the machine when the mold occupies the position shown in this figure; Fig. 3 is a view of one of the halves of a mold with its end attachments as used upon the machine when the mold occupies the position shown in this figure; Fig. 4 is an exterior view of the whole mold with end attachments the same as in Fig. 2; and Fig. 5 is a central vertical section of the finished pipe.

So far as relates to the machine this invention is only an improvement upon the drain-pipe machine covered by Letters Patent issued to me December 7, 1869.

The nature of the invention consists, first, in making a plunger which extends entirely through the mold when at or near the top of its movement, so that when the plunger retreats or descends there is no tendency to disturb the yet plastic pipe. Second, in providing guides or ways for the lower end of the plunger, and in making these ways adjustable to different-sized plungers. Third, in operating the annular plunger by means of projections or a projection from the main plunger. Fourth, in providing means to keep the annular plunger up after it has formed the end of the pipe till after the main plunger has commenced its descent. Fifth, in making a pipe so that it can be used in connection with other sections like itself, with the common bell-mouth pipe, or with that common form of pipe which has so called V-shaped ends. Sixth, in constructing molds for making the pipe just described.

The letter $a$ indicates the table of the machine, supported upon any proper frame, $a'$. $b$ is the main plunger, pointed at its upper end, and when elevated, as shown in the drawing, extending quite through the mold or case. The plunger, as shown in my said former patent, did not so extend entirely through the length of the mold, and on its downward stroke would sometimes disturb the interior surface of the pipe in consequence. This defect is entirely cured by making the plunger full length, as shown. This plunger is made to rise and fall by means of the screw-pillar $c$, turning in a bearing at $d$ and meshing into a female thread cut in the base of the main plunger, the body of the plunger being made hollow to allow the screw-pillar to project up into it. Power is applied by means of the bevel-gears and the horizontal shaft. From the lower end of the main plunger a circular flange, indicated by the dotted lines $b'$, extends, whose office is to lift the annular plunger $e$ just as the main plunger is about to complete its upward stroke. From this circular flange project lugs or wings $s$, which slide within the ways $f$, and by this means the base of the main plunger is steadied during its ascent and descent. The ends of the ways $f$ themselves slide in horizontal ways $f^1$, and from their backs project bars $f^2$, which slide in slots in the posts $g$, and by means of pins fitting in the holes $f^3$, the vertical ways $f$ are readily adjusted to the different sizes of main plungers which are used in making different sizes of pipe.

I do not intend to confine myself to just the means shown for adjusting the vertical ways, as it is obviously easy to effect this in other ways—as, for instance, having a ratch upon the sides of the bars $f^2$, and then hanging a vertical shaft with gears upon it meshing into these rachets. The turning of such a shaft would advance or retract a vertical way all at once. Nor do I confine myself to having but two of these vertical ways, as it may sometimes be desirable to have more.

When the main plunger is clear down the annular plunger $e$ which forms the V-end of the pipe is also down below the table, but just before the main plunger completes its upward movement the flange $b'$ comes up against the lower side of the annular plunger and lifts it up to perform its duty, its upward movement ending with the upward movement of the main plunger. By causing the annular plunger to perform its duty at this time additional compression is given to this end of the pipe, and it is therefore made harder and firmer than the body of the pipe, which is an improvement. The lifting the annular plunger by a flange on the main plunger is a simplification of machinery over that shown in my said former patent. When the annular plunger arrives at its highest elevation a spring-catch, $i$, catches it and holds it there while the main plunger descends and until the operator chooses to release it. On the side of the mold at its base is a wedge, $h$; and when the mold or casing is set upon the table it is revolved so as to make this wedge throw outward the upper end of the pivoted lever $h'$, and then compress the spring upon the catch $i$ so that the catch will spring forward and hold up the annular plunger as soon as opportunity offers. When the mold is removed after the making of a pipe, then the catch flies back and the released annular plunger drops down to await its duty in forming another pipe. The letter $k$ indicates one of the two halves of a mold which are secured together in any proper manner, as by hooks and pins, (shown in Fig. 4.) This casing can be used, to form my improved form of pipe, either end uppermost. When the bell-mouth end is uppermost and the pipe is made on the machine a ring, $l$, is fastened around the bottom, and the cap $m$ is fastened on the top. When the opposite end is uppermost (Fig. 3) the casing sets flatly down on the table and the cap $n$ is fastened on the upper end. The method of fastening on these rings and caps is shown in Fig. 4. On the cap $m$ are two hooks or clamps, $m'$, which, by revolving the cap, are made to catch upon the lugs $k'$ so as to wedge the cap on tightly. By means of similar hooks and lugs the ring $l$ is fastened on. The casing is fastened to the table by similar hooks upon the table catching upon lugs placed on the outside of these rings; this fastening, however, is described and claimed in my said former patent. The shape of the pipe produced is shown in Fig. 5, from which it is plainly to be seen that sections of this pipe can be used together or with the common form of pipe which has so-called V-shaped ends. When it is desired to use one of these sections in connection with the common form of pipe having a "bell-mouth" end, the annular projection $z$ is broken off, this being but a few seconds' work to do.

When pipe with V-shaped ends is referred to herein, such reference means the pipe called by that name which has been in common use among pipe-makers; and no interference is intended with the claim to a so-called pipe with V-shaped ends, covered by Letters Patent issued to John W. Stockwell, July 4, 1871, No. 116,643.

I claim as my invention—

1. The combination of the casing which forms the exterior of the pipe, with the main plunger $b$ pointed at its end and extending quite through the length of the casing, and the annular plunger $e$ for forming the lower end of the pipe.

2. In combination with the main plunger of a pipe-forming machine, $b$, the ways $f$ made adjustable to varying sizes of the plunger, substantially as described.

3. The combination of the main plunger $b$ and the annular plunger $e$, the former operating the latter by means of the projection $b'$, substantially as described.

4. In combination with the annular plunger $e$ the spring-catch $i$, operating substantially as described.

5. In combination with the mold or casing which forms the exterior of the pipe, the cap $m$ having the V-shaped projection shown on its under surface, and fastened to the casing by means of the hooks $m'$ and spurs $k'$, substantially as described.

6. In combination with the mold or casing which forms the exterior of the pipe, the cap $n$ having the V-shaped projection shown on its under surface, and fastened to the casing by means of hooks $m'$ and spurs $k'$, substantially as described.

7. The pipe having at one end, as shown in Fig. 5, both the bell-mouth and the V-shaped projection, substantially as described.

PETER McINTYRE.

Witnesses:
   Wm. E. Simonds,
   T. E. Steele.